(12) United States Patent (10) Patent No.: US 8,531,405 B2
Khoury (45) Date of Patent: Sep. 10, 2013

(54) DESIGNATED KEYBOARD FOR CHATTING IN ARABIC

(76) Inventor: Elias Khoury, Haifa (IL)

( * ) Notice: Subject to any disclaimer, the term of this patent is extended or adjusted under 35 U.S.C. 154(b) by 133 days.

(21) Appl. No.: 13/128,902

(22) PCT Filed: Oct. 15, 2009

(86) PCT No.: PCT/IL2009/000980
§ 371 (c)(1),
(2), (4) Date: May 17, 2011

(87) PCT Pub. No.: WO2010/058386
PCT Pub. Date: May 27, 2010

(65) Prior Publication Data
US 2011/0216012 A1    Sep. 8, 2011

(30) Foreign Application Priority Data

Nov. 20, 2008    (IL) .......................................... 195428

(51) Int. Cl.
*G06F 3/048*    (2013.01)
(52) U.S. Cl.
USPC .......................................................... 345/171
(58) Field of Classification Search
None
See application file for complete search history.

(56) References Cited

U.S. PATENT DOCUMENTS

| | | | |
|---|---|---|---|
| 4,680,710 A | 7/1987 | Kizilbash | |
| 2006/0100848 A1 | 5/2006 | Cozzi | |
| 2009/0172530 A1* | 7/2009 | Chang ........................... | 715/700 |

FOREIGN PATENT DOCUMENTS

| | | |
|---|---|---|
| WO | 2006/117798 | 11/2006 |
| WO | WO 2010094121 A1 * | 8/2010 |

OTHER PUBLICATIONS

PCT International Preliminary Report on Patentability for PCT/IL2009/0000980, Nov. 25, 2010 (10 pages).

* cited by examiner

*Primary Examiner* — Joseph Haley
(74) *Attorney, Agent, or Firm* — Roach Brown McCarthy & Gruber, P.C.; Kevin D. McCarthy

(57) ABSTRACT

Method and system for generating letters and characters in a certain language using a standard Latin keyboard, according to which the letters of the certain language which have corresponding Latin letters are generated by pressing the corresponding Latin letter keys, using the standard ASCII code of the keyboard. The standard ASCII code is expanded to an extended code that can represent certain language letters which do not have corresponding Latin letters and certain language letters which do not have corresponding Latin letters but look similar to, or associated with, another certain language letters that do correspond to Latin letters, using the extended code. Certain language letters which do not have corresponding Latin letters are generated by typing the keys where the certain language letters are located on a standard Latin keyboard of the certain language, using the extended code. Then certain language letters which do not have corresponding Latin letters but look similar to, or associated with, another certain language letters that do correspond to Latin letters are generated using the extended code, by double clicking on the corresponding Latin letter keys. Finally, certain language letters which do not have corresponding Latin letters but look similar to another certain language letters that are generated are generated by double clicking the letters that are generated, using the extended code.

17 Claims, 8 Drawing Sheets

| Arabic | Chat |
|---|---|
| ء | 2 |
| ع | 3 |
| غ | gh/3' |
| ح | 7 |
| خ | 5/7'/kh |
| ص | S/9 |
| ض | D/9' |
| ط | TH/T/6 |
| ظ | Z/TH/6' |
| ق | q/8/9/2 |
| ا | a |
| ب | b |
| د | d |
| ذ | z/th |
| ف | f/ph |
| ه | h |
| ج | g/j |
| ك | k |
| ل | l |
| م | m |
| ن | n |
| ر | r |
| س | s |
| ش | sh |
| ت | t |
| ث | s/th |
| و | w |
| ي | i/y |
| ز | z |

Fig. 1

| A B C D E F G H I J K L M N O P Q R S T U V W X Y Z |

ا ب ت ث ج ح خ د ذ ر ز س ش ص ض ط ظ ع غ ف ق ك ل م ن ه و لا ي

A ا , ى
B ب , پ
T ت
    ث
G,J ج , چ
    ح
    خ
D د
    ذ
R ر
Z ز , ئ
S س
    ش
    ص
    ض
    ط
    ظ
    ع
    غ
F ف , ڤ
    ق
K ك
L ل
M م
N ن
H ه , ة
O,W و
    لا
E,I,Y ي
C ؤ
X أ , إ

Mixed Mode

Mar7aba

DESIGNATED KEYBOARD FOR CHATTING IN ARABIC

REFERENCE TO CO-PENDING APPLICATIONS

Priority is claimed (1) (a) as a continuation-in-part of PCT/IL2009/000980, filed on Oct. 15, 2009; and (b) as a 371 international of PCT/IL2009/000980, filed on Oct. 15, 2009; and (2) wherein PCT/IL2009/000980 further claims priority to Israeli patent application serial number 195428, filed on Nov. 20, 2008.

FIELD OF THE INVENTION

The present invention relates to a keyboard. More particularly, the invention relates to a standard universal keyboard with unique means for generating characters in another language.

BACKGROUND OF THE INVENTION

Current standard keyboards are specifically designed for users typing in the English language. In order for a standard keyboard to be used for typing letters in other languages, it can easily be modified, by providing software computer means that supports this language. To assist the user, most of the letters of the other language can be printed on the keyboard beside the English letters. This enables the user to type in English mode or in the other language mode, whichever the user chooses.

The most reasonable solution for a user wishing to type letters of other languages is to obtain a special keyboard that comprises key buttons fitting for typing in the other language. However, these keyboards are not always available, and more so, for example if such a foreign language user is living, traveling or working in the USA and he only has a standard keyboard in his possession, then he can not type in his foreign language.

US 2006/0100848 describes a diacritic chording system uses a single standard keyboard layout to generate diacritical characters used, for example, by Latin-based languages or languages based on a Roman character set, providing a universal keyboard. The key combination required to select a diacritic is consistent, independent of the language the user is typing. The diacritic chording system uses chording to obtain characters modified by diacritics, i.e., diacritical characters. The key combinations in the diacritic chord are chosen in such a way to aid memorization by positional association of the keys or by logic association of the keys within the diacritic chord. The use of a combination of positional association and logical association eliminates conflicts in mapping diacritics for different languages. The diacritic chording system also provides a screen overlay as a mnemonic to illustrate which diacritic chords provide the desired diacritical character. However chording is not always user friendly. It can be complicated and take needless valuable extra time to implement.

An efficient way to type in the Arabic language is to obtain an Arabic keyboard. Using such Arabic keyboards enables the user to fully use the Arabic language. However, most Arabic language users who have only a standard keyboard can not type in Arabic, and they must improvise by typing in the Arabic language using Latin letters of a standard keyboard. This is used widely between Arabic chatters on the internet. However, there are many difficulties fully writing and fully expressing ideas in a correct manner using this type of improvisation, because there are Arabic letters which do not have corresponding Latin letters. Today, one of the improvised existing methods to overcome this problem is to use a combination of letters which sounds similar to the sound of the Arabic letter, or to use numbers to type some of the Arabic letters which look similarly to the numbers:

Typing "TH" is used instead of ث and ذ but still there is a substantial difference between the two Arabic letters.
Typing "7" is used instead ح
Typing "5" or "KH" is used instead of خ
Typing "SH" or "CH" is used instead of ش
Typing "6" is used instead of ط
Typing "3" is used instead of ع
Typing "GH" is used instead of غ

FIG. 1 shows a list of the Arabic characters and their corresponding Latin letters or clumsy improvisations.

As can be seen, these improvised methods are not satisfying, are not user friendly, they can be complicated and take needless valuable extra time to implement. Computer chatting, which is most efficient when implemented in a fast manner, is relatively slow in this case because it takes time for the user to find the most correct improvisation character. More so, even when using these improvised methods not all Arabic letters can be expressed using a standard keyboard (for example "TH" is used instead of ث and ذ which sound differently, wherein one sounds like "TH" as in "THINK" and the other sounds like "TH" as in "THEY"). Also, in Arabic there are vowel points that are not letters but sounds and they are placed above or beneath the letters. Standard Arabic keyboards do not provide means for typing with added vowel points above or beneath the letters in a user friendly manner. The vowel points in a standard Arabic keyboard are dispersed throughout the keyboard. More so, in order to type vowel points, one must also press extra keys like SHIFT, which is not user friendly, and that takes extra needless time.

It is therefore an object of the present invention to provide means for typing all Arabic letters and characters on a standard keyboard while typing each of the letters and characters in an easy user friendly manner and a short period of time.

It is further an object of the present invention to provide means for typing in Arabic using Latin letters on a standard keyboard in an easy, user friendly manner without need for clumsy improvisations.

It is still an object of the present invention to provide means for typing in the Arabic language with added vowels points in a fast and easy user friendly manner.

Other objects and advantages of the invention will become apparent as the description proceeds.

SUMMARY OF THE INVENTION

The present invention is directed to a method for generating letters and characters in a certain language (e.g., Arabic) using a standard Latin keyboard, that comprises:
 a) generating the letters of the certain language which have corresponding Latin letters, by pressing the corresponding Latin letter keys, using the standard ASCII code of the keyboard;
 b) expanding the standard ASCII code to an extended code being capable of representing certain language letters which do not have corresponding Latin letters and certain language letters which do not have corresponding Latin letters but look similar to, or associated with, another certain language letters that do correspond to Latin letters, using the extended code;
 c) generating certain language letters which do not have corresponding Latin letters, by typing the keys where the certain language letters are located on a standard Latin keyboard of the certain language, using the extended code;

d) generating certain language letters which do not have corresponding Latin letters but look similar to, or associated with, another certain language letters that do correspond to Latin letters, using the extended code, by double clicking on the corresponding Latin letter keys; and e) generating certain language letters which do not have corresponding Latin letters but look similar to another certain language letters that are generated according to step c) above by double clicking the letters that are generated according to step c) above, using the extended code.

The method may comprise:

a) generating the letters of the certain language which have corresponding Latin letters by pressing their keys, using the standard ASCII code of the keyboard;

b) generating the certain language letters which do not have corresponding Latin letters by:

b.1) generating some of the certain language letters that do not have corresponding Latin letters but look similar to, or associated with, another certain language letters that do correspond to Latin letters and that are represented by corresponding Latin letters with an intuitive symbol above, beneath or beside the corresponding Latin letters, using the extended code, by double clicking the corresponding Latin letter keys;

b.2) generating some of the certain language letters that do not have corresponding Latin letters and do not look similarly to any of certain language letters that do correspond to Latin letters and that are represented by their certain language form, according to step c) above.

The characters may be vowel points that are placed above or beneath the letters. The letters and characters are preferably displayed to a receiver of a chatting session as well as to the sender. Words or sentences in the certain language may comprise a combination of characters in Latin and characters in the certain language that complete missing characters, or only characters in the certain language.

The present invention is also directed to a system for generating letters and characters in a certain language, that comprises a standard Latin keyboard and associated software that expands the existing ASCII code of the keyboard to an extended code, for allowing a user to:

a) generate the letters of the certain language which have corresponding Latin letters, by pressing the corresponding Latin letter keys;

b) generate certain language letters which do not have corresponding Latin letters, by typing the keys where the certain language letters are located on a standard Latin keyboard of the certain language, using the extended code;

c) generate certain language letters which do not have corresponding Latin letters but look similar to, or associated with, another certain language letters that do correspond to Latin letters, by double clicking on the corresponding Latin letter keys, using the extended code; and d) generate certain language letters which do not have corresponding Latin letters but look similar to another certain language letters that are generated according to step b), by double clicking the letters that are generated according to step b) above, using the extended code.

BRIEF DESCRIPTION OF THE DRAWINGS

In the drawings:

FIG. 1 shows a conventional prior art method for poorly representing Arabic characters;

FIG. 2 shows a comparison between the English alphabet Latin letters and the Arabic alphabet letters;

FIGS. 5A to 5C show a comparison between prior art representation of an Arabic word and the presentation of the same word according to the present invention;

DETAILED DESCRIPTION OF THE INVENTION

The present invention is a keyboard system that comprises a standard keyboard. The system further comprises software means that expands and enlarges the ASCII code of a standard computer such that it enables a user to type in Arabic enabling the use of all Arabic letters and vowel points using said standard keyboard. The typing of the Arabic letters is implemented from right to left. The present invention is especially useful for chatters.

FIG. 2 shows the English alphabet Latin letters (1), the Arabic alphabet letters (2) and a comparison of the two (3). It can be seen that some letters in Arabic have their corresponding ones in Latin, but several others do not.

(ث , ح , خ , ذ , ش , ص , ض , ط , ظ , ع , غ , ق)

The present invention software means enable a new keyboard working mode.

The working mode functions in the following manner:

1. The Arabic letters which have corresponding Latin letters as shown in FIG. 2, are generated by these Latin letter keys. It should be noted that more than one Latin letter can generate the same Arabic letter, for example, E, I and Y generate the Arabic letter ي. O and W can generate the corresponding vowel letter و.

2. The Arabic letters which don't have corresponding Latin letters are generated as follows:

A) The Latin keys which are not in use Q, U and P generate the Arabic letters ض, ع and ح, similarly to the standard Arabic keyboard.

Figure 3:
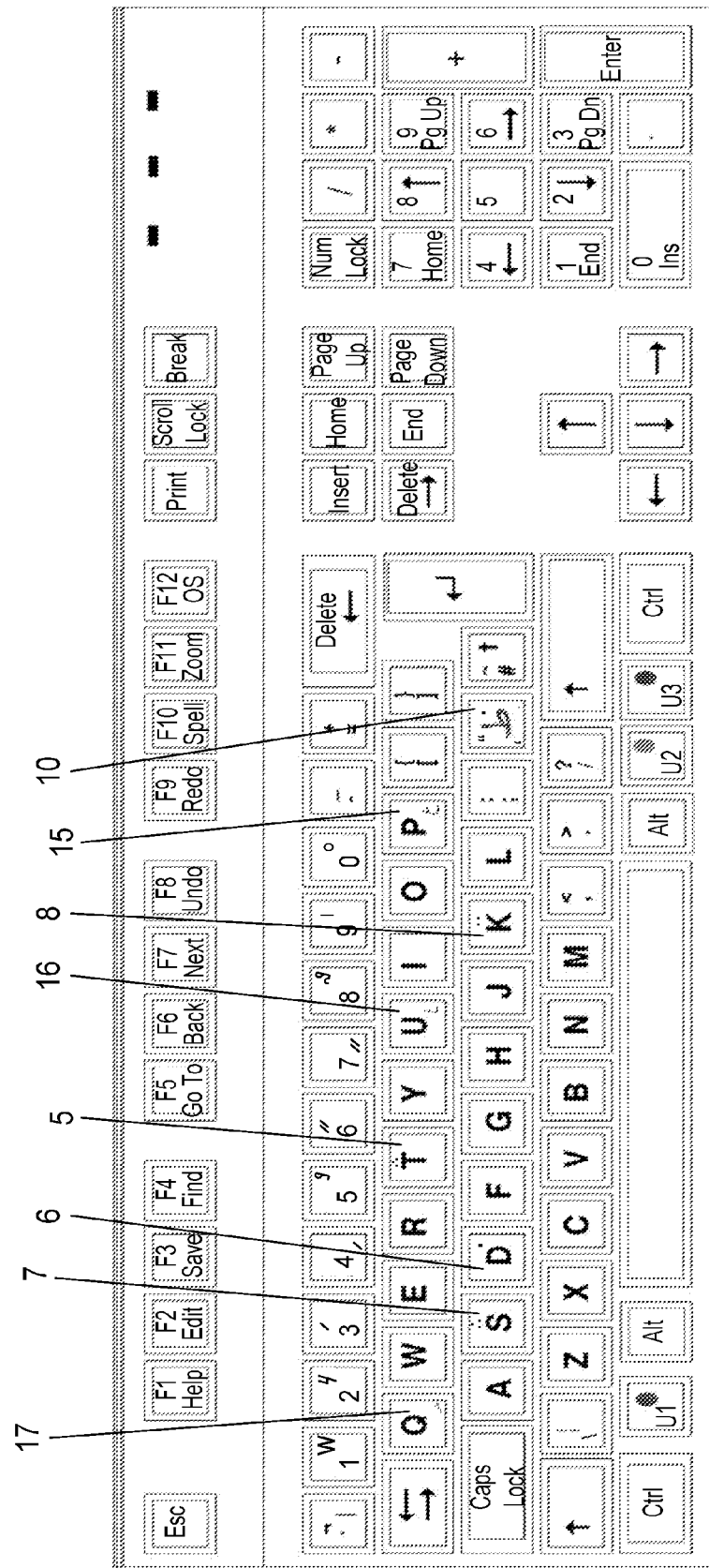
FIG. 3 illustrates a Latin keyboard with complementary keys extension, according to a preferred embodiment of the invention.

B) The Arabic letters that look like one of the Arabic letters that correspond to the Latin letters, or are associated with the Arabic letters that correspond to the Latin letters (i.e. have a similar sound to said Arabic letters that correspond to the Latin letters), can be generated by double clicking the keys of said Arabic letters which correspond to the Latin letters:

If the user double clicks the letter T then one of the Arabic letters that sounds like "TH" (as in "THINK") will be generated—ث. The T on the keyboard comprises three dots on top of itself—T̈ (5) as shown in FIG. 3. That will indicate to the user that the Arabic letter ث can be generated by double clicking T.

If the user double clicks the letter D then one of the Arabic letter that sounds like "TH" (as in "THEY") will be generated—ذ. The D on the keyboard comprises a dot above itself—Ḋ (6). That will indicate to the user that the Arabic letter ذ can be generated by double clicking D.

If the user double clicks the letter S then the Arabic letter that sound like "SH" will be generated—ش. The S on the keyboard comprises three dots on top of itself— S̈ (7) that will indicate to the user that the Arabic letter ش can be generated by double clicking S.

If the user double clicks the letter K then the Arabic letter that sound like a strong K that comes out of the throat—ق, will be generated. The K on the keyboard comprises two dots on top of itself -K̈ (8), that will indicate to the user that the Arabic letter ق can be generated by double clicking K. It should be noted that one click produces ك which sounds like a weaker K than ق. Because both letters are associated with one another (they have a similar sound), double clicking produces ق.

C) When double clicking on Q, U and P (ض, ع and ح the Arabic letters that look the same just with or without the dot on top will be generated:

While being in pure Arabic mode (only Arabic characters and writing from right to left), the following characters will be generated:

If the user double clicks the letter U (wherein one click generates ع, then the Arabic letter غ will be generated.

If the user double clicks the letter P (wherein one click generates ح), then the Arabic letter خ will be generated.

If the user double clicks the letter A (wherein one click generates ا), then the Arabic letter ى (Alef maksura) will be generated.

If the user double clicks the letter B (wherein one click generates ب ), then the letter پ (Peh) will be generated.

If the user double clicks the letter G or J (wherein one click generates ج ), then the letter چ (equivalent to the letter G in the word "Good") will be generated.

If the user double clicks the letter Z (wherein one click generates ز ), then the Arabic letter ى (Ya ء with Hamza above) will be generated.

If the user double clicks the letter F (wherein one click generates ف ), then the letter ڤ (Veh) will be generated.

If the user double clicks the letter H (wherein one click generates ه ), then the Arabic letter ة (Ta ء marbuta) will be generated.

If the user clicks the letter C, then the Arabic letter ؤ (Waw with Hamza above) will be generated.

If the user clicks the letter X, then the Arabic letter أ (Alef with Hamza above) will be generated. If he double clicks, then the Arabic letter إ (Alef with Hamza below) will be generated.

While being in the mixed mode (a combination of Latin and Arabic characters and writing from left to right), the following characters will be generated:

If the user clicks the letter X, then the Latin letter aʼ (a with Hamza above) will be generated. If he double clicks, then the Latin letter a. (a with Hamza below) will be generated.

An exception to all the double clicking keys is the letter Q key, which one click produces ض (with a dot) and double clicking produces ص (without a dot). This is done in order not to confuse the users because in a standard keyboard Q generates ض. Therefore as apposed to all the other letters generated by double clicking wherein one click generates the letter without a dot (or dots) and double clicking generates the letter with the dot (or dots), in the case of Q one click generates the letter with the dot and double clicking generates the letter without the dot.

D) The Arabic letter ط is placed on the parentheses/apostrophe key (10) on a standard Arabic keyboard. The Arabic letter ظ is placed on the question mark/slash key on a standard Arabic keyboard. Since these Arabic letters do not have corresponding Latin letters, they are placed on the parentheses/apostrophe key (10) similarly to the standard Arabic keyboard, wherein according to the present invention ط is generated by one click on the parentheses/apostrophe key (10) and ظ is generated by double clicking the parentheses/apostrophe key (10).

The Arabic letters خ (15), غ (16), ظ (10) and ض (17) are preferably printed on the keyboard beside the corresponding Latin letter or symbol character (i.e. beside P, U, " and Q, respectively) that generates them wherein this indicates to the user their location and that one click generates the letter without a dot and double clicking generates the letter with the dot (except for ض (Q) as explained hereinabove).

As said, in Arabic there are vowel points that are not letters but sounds and they are placed above or beneath the letters. Standard Arabic keyboards do not provide means for typing with added vowel points above or beneath the letters in a user friendly manner. The vowel points in a standard Arabic keyboard are dispersed throughout the keyboard. More so, in order to type vowels one must also type extra keys like SHIFT, which is not user friendly, and takes extra needless time. According to the present invention, the row of numbers is cancelled and instead the keys are used as Arabic vowel points. After typing a letter, if a vowel point key is pressed then the vowel point will be typed above or beneath said letter. If a user would like to type numbers he can easily switch modes to the normal Latin keyboard mode whenever he wants and type numbers, or alternatively use the numbers normally located in an array on the right side of any standard keyboard. Optionally, Arabic numerals can also be typed using the same array. The symbols above the numbers (for example, !, @ or #) can also be typed by using the SHIFT key in combination with key of the required symbol.

Figure 4:
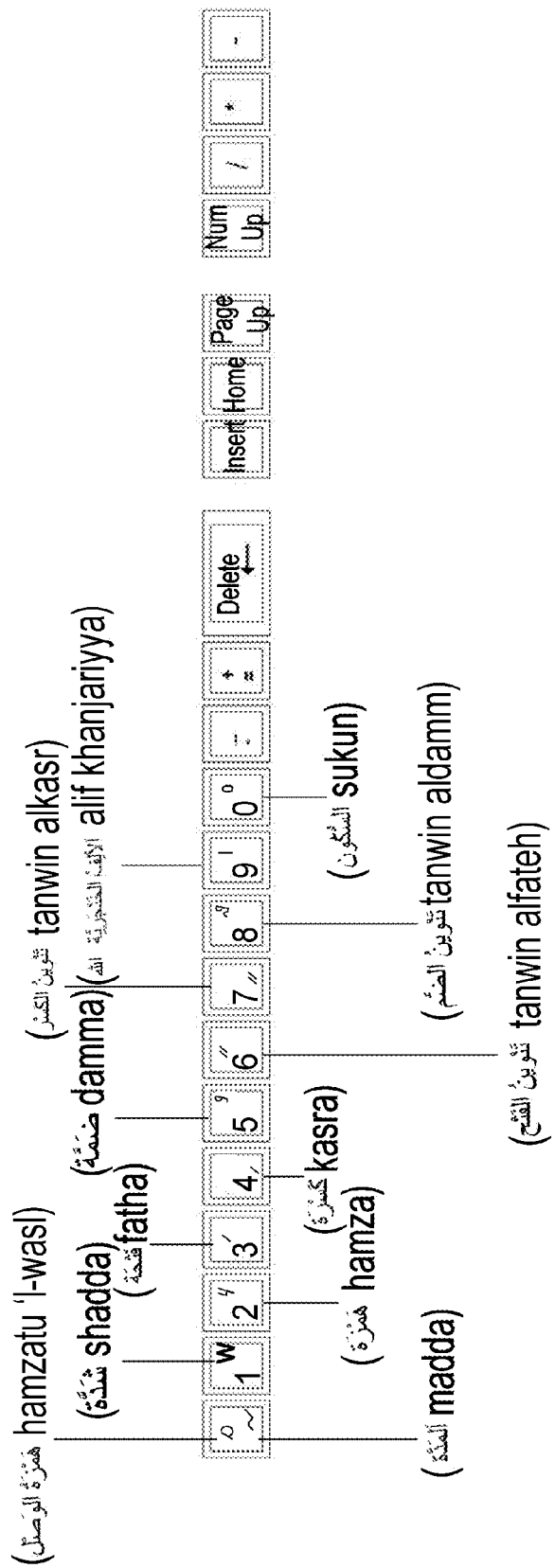
FIG. 4 illustrates a row of a Latin keyboard with complementary keys conversion to represent. Arabic vowel points, according to a preferred embodiment of the invention.

The vowel points are preferably printed along with the numbers (it is possible to return back to these numbers, while being in a pure Arabic mode or in a mixed mode, by pressing (activating) the Caps Lock key) on the keyboard to assist the user, as shown in FIG. 3 and emphasized on FIG. 4, according to the following:

Number Key—1; Arabic Vowel Point—ّ (شَدَّة shadda)

Number Key—2; Arabia Vowel Point—ء (هَمْزَة hamza)

Number Key—3; Arabic Vowel Point—َ (فَتْحَة fatha)

Number Key—4; Arabic Vowel Point—ِ (كَسْرَة kasra)

Number Key—5; Arabic Vowel Point—ُ (ضَمَّة damma)

Number Key—6; Arabic Vowel Point—ً (تَنْوِين الفَتْح tanwin alfateh)

Number Key—7; Arabic Vowel Point—ٍ (تَنْوِينُ الكَسْر tanwin alkasr)

Number Key—8; Arabic Vowel Point—ٌ (تَنْوِينُ الضَّمِّ tanwin aldamm)

Number Key—9; Arabic Vowel Point—ٰ (الأَلِفُ الخَنْجَرِيَّة اللّٰه alif khanjariyya)

Number Key—0; Arabic Vowel Point—ْ (السّكون sukun)

The ~ key, (on the left side of the 1 key) is also used for typing vowel points. Double click produces the vowel point ٓ (المَدَّة madda), and one click produces the vowel point ٱ (هَمْزَةُ الوَصْل hamzatu 'l-wasl).

The present invention is very useful for users who are not used to typing in Arabic. The intuitive relation between a large number of Latin letters and the corresponding Arabic letters makes it easy for a user to type. Also, now a chatter on the internet can chat in a fast manner without all types of clumsy improvisations. Typing in Arabic is smooth without pressing SHIFT or ALT, and the number of letters typed is equal to the number of keys pressed (even though a specific key may be double clicked to generate a letter). In this manner one can fully express himself easily.

In an embodiment of the present invention the system provides means for typing in Arabic using Latin letters on a standard keyboard. Many users prefer typing using Latin letters because it is easier for them to chat that way, or for other reasons. The working mode functions in the following manner:

1. The Arabic letters which have corresponding Latin letters as shown in FIG. 2 are represented by these Latin letters and generated by pressing their keys.
2. The Arabic letters which don't have corresponding Latin letters are generated as follows:
   A) The Arabic letters that look similar to one of the Arabic letters that correspond to the Latin letters, or that associated with the Arabic letters that correspond to the Latin letters (as explained hereinabove), are represented by the following characters (as they appear on the keyboard). T̊ (5), D̊ (6), S̊ (7) and K̈ (8) represent ث, ذ, ش and ق respectively, and are generated by double clicking these characters, (wherein one click will generate T, D, S and K respectively). In this manner the user can intuitively identify these characters.
   B) All the remaining Arabic letters that do not have corresponding Latin letters do not have Latin letter representation and therefore are generated in Arabic just like in the previous embodiment. In this manner words or sentences in Arabic comprise a combination of characters in Latin and characters in Arabic that complete missing characters. The words or sentences in Arabic can even comprise only characters in Arabic (and of course only characters in Latin).

The vowel points are generated in the same manner as in the previous embodiment, and appear above or beneath the generated letters (whether in Latin or in Arabic).

The present invention according to this embodiment is also very useful for users who are not used to typing in Arabic. The intuitive relation between a large number of Latin letters and the corresponding Arabic letters makes it easy for a user to type. Also, now a chatter on the internet can chat in a fast manner without all types of clumsy improvisations. Typing in the Arabic language using Latin letters is smooth without pressing SHIFT or ALT, and the number of letters typed is equal to the number of keys pressed (even though a specific key may be double clicked to generate a letter). In this manner one can fully express himself easily.

According to the present invention, when chatting on the internet, if a user of the present invention types a message and submits it, the receiver of the message can also read the message exactly as the sender typed it, i.e. if the sender wrote in Arabic using the present invention (according to the first embodiment), the receiver will see the message in Arabic. If the sender wrote in Arabic represented by Latin letters (according to the second embodiment), the receiver will see the message accordingly. The receiver sees what the sender sees.

FIGS. 5A to 5C illustrate a comparison between the representation of an Arabic word between prior art methods and the method proposed by the present invention. According to prior art methods, the word مَرْحَبًا, shown in FIG. 5A is typed during chatting as "Mar7aba" (shown in FIG. 5B), i.e., using the vowel "a" and the numeral 7 as a substitute for the character ح, which is a relatively poor representation. On the other hand, according to the present invention, the same word is typed during chatting as Mŕc̈ba (shown in FIG. 5C), i.e., using exactly the same number of characters (5 in this case), without needing any vowels or poor substitutes, while combining 4 intuitive substitutes (M, r, b, a) and the original character ح, which does not have an intuitive substitute, along with the corresponding vowel points.

Even though the present invention has been explained throughout the detailed description with reference to the Arabic language, the present invention can also be applied using a standard keyboard for typing letters in other languages in a similar manner.

Advantages:

The method proposed by the present invention discloses a solution to the problem of offering an efficient, intuitive and user friendly layout and allocation of keys, based on the standard layout of a Latin keyboard. The layout proposed by the present invention is much more similar to the layout of an original Arabic keyboard. The allocation of keys is done such that the Latin characters are divided into four groups:

Group 1: Arabic letters that have intuitively corresponding Latin letters (a=ا, b=ب, t=ت, j/g=ج, d=د, r=ر, z=ز, s=س, f=ف, k=ك, l=ل, m=م, n=ن, h=ه, o=و, i/y/e=ي)

Group 2: Arabic letters that have no corresponding Latin letters and that were added to the Latin keyboard (p=ح, u=ع, q=ض, '=ط). The key allocation of these letters exactly matches the corresponding keys in a standard Arabic keyboard. In addition, the Arabic letters in this group have conjunct letters that differ from the letters only by vocalization + a dot (ح=خ, ع=غ, ص=ض, ط=ظ), which is activated by pressing the elected key only once or twice.

Group 3: Arabic letters that do not exist in Latin but have similar letters in the Arabic language, i.e., (three letters T̊, D̊ and S̊) similar in shape but different in pronunciation and one letter ((K̈)) which is similar in pronunciation but different shape (T=ت ⇒ ث, S=س ⇒ ش, D=د ⇒ ذ, K=ك ⇒ ق).

Group 4: Arabic letters that are variations of other letters (H=ة, A=ى) are allocated on key that have association with the letter itself. Again, these similar letters are activated by pressing the elected key only once or twice.

All the vocalization points are located on the upper row of Latin numerals, so as to allow the user adding vocalization to each character very easily by just pressing the selected key only once.

According to the present invention, all Arabic letters may be obtained directly by pressing a key once or twice. There is no need to remember or to guess how many times a key should be pressed until obtaining the desired Arabic character. In order to type letters, the user does not have to use the Shift function at all. Therefore, the present invention proposes a method with substantial advantages, due to the fact that the user can quickly chat or type in a streaming manner as if he is using a standard Arabic keyboard, rather than remembering or guessing how many times he has to press a key for obtaining a desired character.

By using the method proposed by the present invention, the user can freely type: (a) in two modes from right to left using the Arabic alphabet, as originally done when using a standard Arabic keyboard; (b) Typing in Arabic language from left to right by using the combination of Latin letters, Arabic letters and the new group described in Sec B above.

The method proposed by the present invention not only completes the missing characters, but also allows the user to simply activate the intuitive Arabic typing mode while having all the required characters of the Arabic alphabet and vocalization. The present invention is the first to suggest applying Arabia vowel points in Latin letter, as shown in FIG. 5C.

Figure 6A:
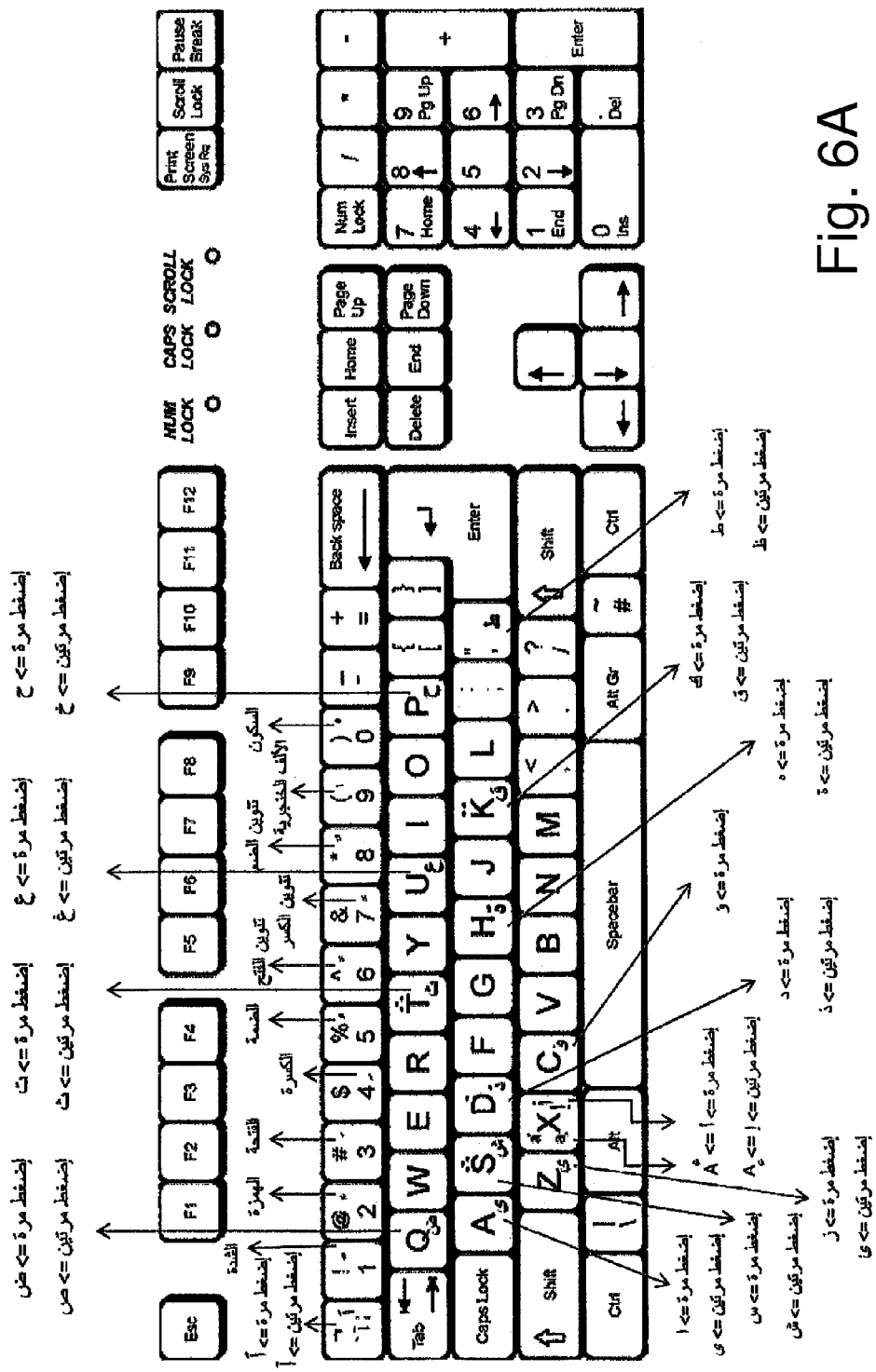
FIG. 6A shows a possible new Arabic Keyboard layout that may be implemented using the method proposed by the present invention.

FIG. 6A shows a possible new Arabic Keyboard layout that may be implemented using the method proposed by the present invention.

Figure 6B:
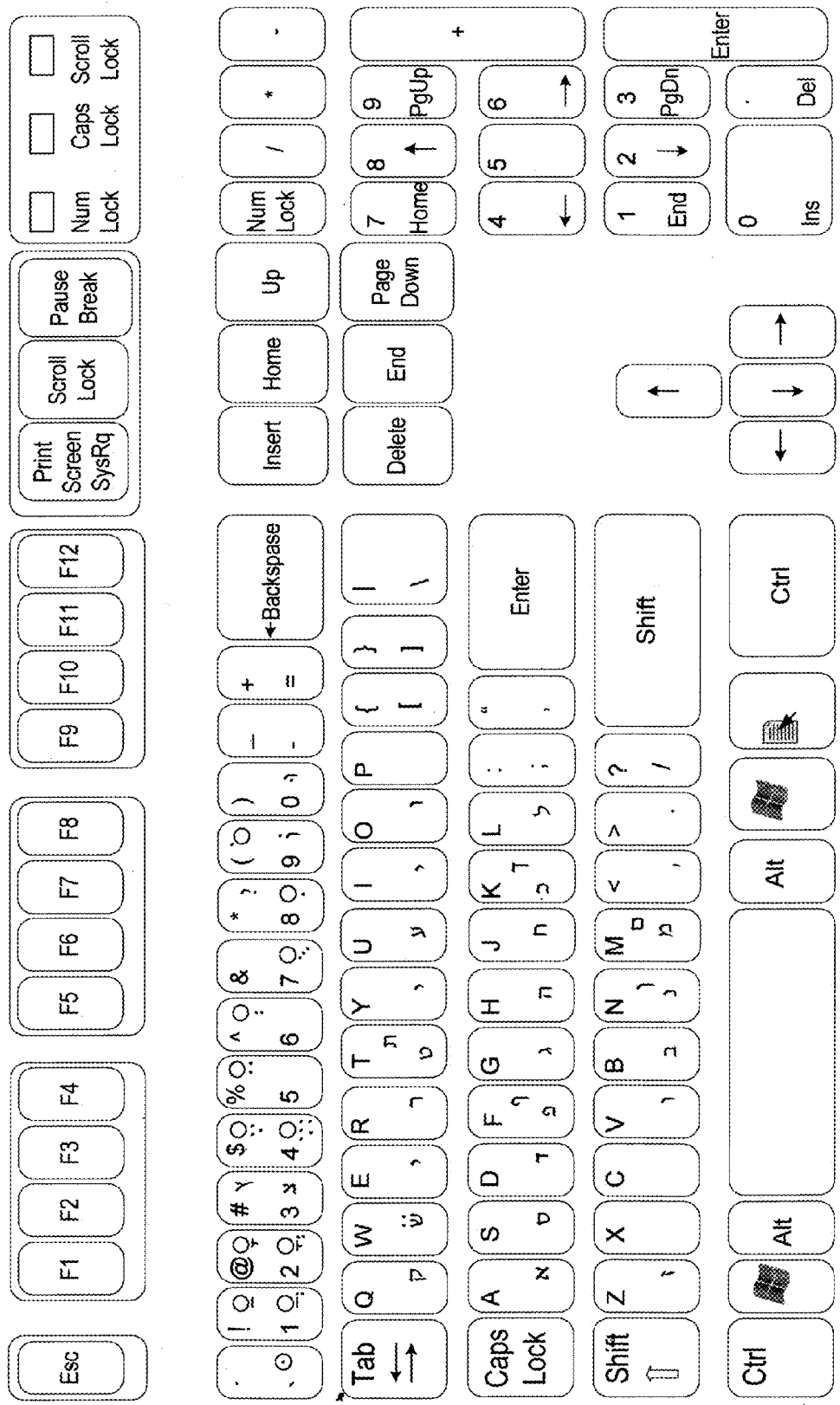
FIG. 6B shows a possible implementation of a keyboard dedicated to the Hebrew language.

FIG. 6B shows a possible implementation of a keyboard dedicated to the Hebrew language.

Figure 6C:
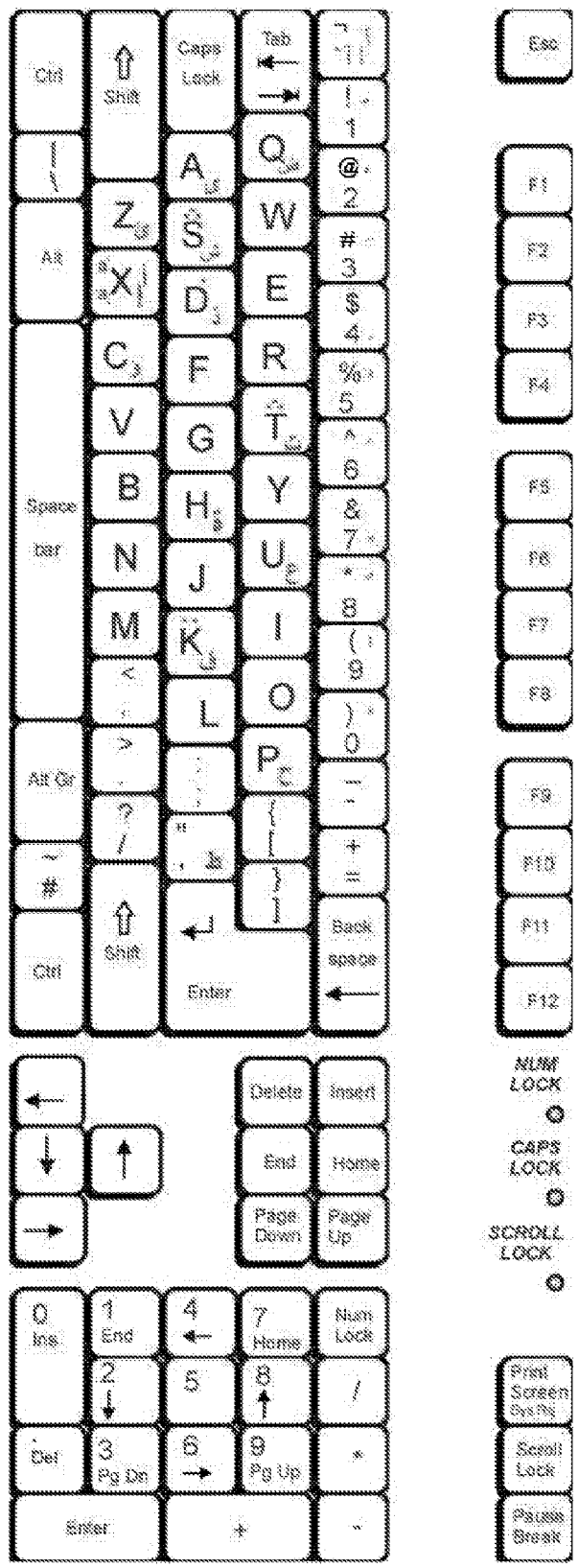
FIG. 6C shows a possible implementation of a keypad of a cellphone.

FIG. 6C shows a possible implementation of a keypad of a cellphone by reducing a part of the keyboard and rotating its layout 90° counterclockwise. The result is a keypad that includes Latin and Arabic alphabets, as well as numerals, for allowing a user to easily dial, chat and type.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for typing in Arabic using a standard English letter keyboard, comprising:
   a) expanding the standard ASCII code of said English letter keyboard to an extended code for associating:
      i) each of one or more first keys of said English letter keyboard with a corresponding first Arabic letter such that an English letter typable by one of said first keys and said corresponding first Arabic letter have a same pronunciation;
      ii) each of one or more second keys of said English letter keyboard with a pair of corresponding second Arabic letters, wherein an English character or pronunciation represented by one of said second keys is not in use in Arabic, and two letters of each of said corresponding pairs of second Arabic letters are identical to each other with the exception of the addition of a dot to one of said two letters; and
      iii) each of one or more third keys of said English letter keyboard with a corresponding third Arabic letter which represents a sound not being utterable during pronunciation of any single English letter;
   b) applying indicia to each of said third keys so as to provide a recognizable association with a corresponding third Arabic letter; and
   c) typing in Arabic by clicking on a desired series of said first, second and third keys to generate letters or words including original third Arabic letters.

2. The method according to claim 1, wherein a letter is generated by clicking on one of the first, second or third keys no more than twice.

3. The method according to claim 1, wherein the extended code also associates each of one or more fourth keys of the Latin letter keyboard with one or more corresponding vowel points, whereby to generate said one or more vowel points above or beneath a generated letter.

4. The method according to claim 3, wherein the Arabic letters and vowel points are displayed to a receiver and to a sender of a chatting session.

5. The method according to claim 1, wherein typed words or sentences using the extended code include a series of English letters and original third Arabic letters that complete missing characters, only English letters, or only Arabic letters.

6. A keyboard system for typing in Arabic using a standard English letter keyboard comprising:
   a) said standard English letter keyboard; and
   b) computer means provided with software for expanding the existing ASCII code of said English letter keyboard so as to associate:
      i) each of one or more first keys of said English letter keyboard with a corresponding first Arabic letter such that an English letter typable by one of said first keys and said corresponding first Arabic letter have a same pronunciation;
      ii) each of one or more second keys of said English letter keyboard with a pair of corresponding second Arabic letters, wherein an English character or pronunciation represented by one of said second keys is not in use in Arabic, and two letters of each of said corresponding pairs of second Arabic letters are identical to each other with the exception of the addition of a dot to one of said two letters; and
      iii) each of one or more third keys of said English letter keyboard with a corresponding third Arabic letter which represents a sound not being utterable during pronunciation of any single English letter;
   wherein each of said one or more third keys has the same position as a key in a standard Arabic keyboard which generates said corresponding third Arabic letter,
   wherein words or sentences in Arabic are typable upon clicking on a desired series of said first, second and third keys.

7. The keyboard system according to claim 6, wherein the keyboard is a keypad of a cellphone.

8. The keyboard system according to claim 7, wherein the layout of the keypad is rotated 90° counterclockwise.

9. The method according to claim 5, wherein a typed word using the extended code has the same number of letters as the same word which is originally typed in Arabic.

10. The method according to claim 3, wherein all of the one or more fourth keys are located on the same row of the English letter keyboard.

11. The method according to claim 10, wherein the same row is the row of numbers of the English letter keyboard.

12. The method according to claim 5, wherein the letters of the typed words or sentences are displayed from left to right.

13. The method according to claim 5, wherein the letters of the typed words or sentences are displayed from right to left.

14. The method according to claim 1, wherein the Arabic letters are displayed to a receiver and to a sender of a chatting session.

15. The method according to claim 3, wherein a vowel point is generated by clicking on one of the fourth keys only once.

16. The keyboard system according to claim 6, wherein the software is also operable to associate each of one or more fourth keys of the English letter keyboard with one or more corresponding Arabic vowel points, whereby to generate said one or more vowel points above or beneath a generated letter.

17. The keyboard system according to claim 16, wherein all of the one or more fourth keys are located on the same row of the English letter keyboard.

\* \* \* \* \*